United States Patent
Imai

(10) Patent No.: US 7,310,467 B2
(45) Date of Patent: Dec. 18, 2007

(54) METHOD OF FABRICATING OPTICAL WAVEGUIDE

(75) Inventor: Genji Imai, Kanagawa (JP)

(73) Assignee: Kansai Paint Co., Ltd., Amagasaki-shi, Hyogo (JP)

( * ) Notice: Subject to any disclaimer, the term of this patent is extended or adjusted under 35 U.S.C. 154(b) by 0 days.

(21) Appl. No.: 11/185,390

(22) Filed: Jul. 20, 2005

(65) Prior Publication Data

US 2006/0018615 A1 Jan. 26, 2006

(30) Foreign Application Priority Data

Jul. 22, 2004 (JP) ............................. 2004-213772

(51) Int. Cl.
*G02B 6/10* (2006.01)

(52) U.S. Cl. ...................... 385/129; 385/130; 385/131

(58) Field of Classification Search ......... 385/129–131
See application file for complete search history.

(56) References Cited

U.S. PATENT DOCUMENTS 5,598,501 A 1/1997 Maruo et al.

2004/0033007 A1* 2/2004 Ohtsu et al. .................. 385/14
2004/0146263 A1 7/2004 Mune et al.
2004/0197698 A1 10/2004 Tamaki et al.
2006/0008225 A1* 1/2006 Naitou et al. ................ 385/129

FOREIGN PATENT DOCUMENTS

| CN | 1504780 A | 6/2004 |
|---|---|---|
| CN | 1507580 A | 6/2004 |
| JP | 4-86707 | 3/1992 |
| JP | 8-304650 | 11/1996 |
| JP | 8-313747 | 11/1996 |
| JP | 08304650 | * 11/1996 |
| JP | 2002-40250 | 2/2002 |
| KR | 2001-0060293 | 7/2001 |

* cited by examiner

*Primary Examiner*—Jennifer Doan
(74) *Attorney, Agent, or Firm*—Knobbe Martens Olson & Bear LLP

(57) ABSTRACT

A method of fabricating an optical waveguide which comprises forming a core layer (c) on surface of a peelable substrate (a), then forming a clad layer (d) on the surface of the core layer (c) and the surface of the substrate (a), and then peeling the substrate (a) off from the core layer (c) and the clad layer (d) to fabricate an optical waveguide of which the top face (e) or the bottom face of the core layer (c) is not covered by the clad layer (d).

7 Claims, 3 Drawing Sheets

METHOD OF FABRICATING OPTICAL WAVEGUIDE

BACKGROUND OF THE INVENTION

1. Field of the Invention

The present invention relates to a method of fabricating an optical waveguide of which the top face or the bottom face of the core layer is not covered by the clad layer, and which is suitable for use as an optical integrated circuit.

2. Description of the Prior Art

As ever greater capacity and higher speed of information processing in optical communication systems and computers are required today, optical waveguides are attracting increasing note as media for the transmission of light.

A known method of fabricating an optical waveguide comprises, for instance, a step of preparing a first clad member having a concave groove in its surface; a step of covering the concave groove and the surroundings of the concave groove by forming a coat of a first liquid high molecular material over the first clad member; a step of forming, by thermally treating the coat of the first liquid high molecular material, a core member having in its surface a depressed part whose height is lower at the concave groove than in the surroundings of the concave groove and whose depth is equal to or greater than the thickness of the surroundings of the concave groove; a step of forming a coat of a second liquid high molecular material over the first clad member and core member; and a step of forming, by thermally treating the coat of the second liquid high molecular material, a second clad member (see Japanese Patent Laid-Open No. 2002-350661).

However, an optical waveguide having no clad layer on the surface of the core part cannot be fabricated by this method.

On the other hand, there are methods by which an optical waveguide whose core member is not covered by a clad member can be fabricated. By a known one among such optical waveguide fabrication methods, a film consisting of a photosensitive material is formed over a substrate, then an optical waveguide core pattern is formed on that film by exposure to light, stabilizing after that the photosensitive material or its derivative to form a pattern layer consisting of a core part and a clad part (see Japanese Patent Laid-Open No. 2003-14966).

However, what is fabricated by this method is an optical waveguide of which neither the top face nor the bottom face of the core layer is covered by a clad layer, but an optical waveguide of which only one face of the top face and the bottom face of the core layer is not covered by a clad layer cannot be fabricated thereby.

SUMMARY OF THE INVENTION

An object of the present invention is to provide a method of fabricating an optical waveguide comprising a core layer and a clad layer wherein the core layer is disposed within the clad layer, and the top face or the bottom face of the core layer is not covered by the clad layer.

The present invention is a method of fabricating an optical waveguide which comprises forming a core layer on the surface of a peelable substrate, then forming a clad layer on the surface of the core layer and the surface of the substrate, and then peeling the substrate off from the core layer and the clad layer to fabricate an optical waveguide of which the top face or the bottom face of the core layer is not covered by the clad layer.

A typical embodiment of the present invention is a method of fabricating an optical waveguide which comprises coating the surface of a peelable substrate with a negative energy ray-sensitive material or a positive energy ray-sensitive material, irradiating the coat with an energy ray, and developing the irradiated coat to form a core layer, then coating the parts of the surface of the core layer and the substrate with a material for forming a clad layer, wherein a clad layer is to be formed on the parts, to form the clad layer having a lower refractive index than that of the core layer, and, then peeling the substrate off from the core layer and the clad layer to fabricate an optical waveguide of which the top face or the bottom face of the core layer is not covered by the clad layer.

Furthermore, the another embodiment of the present invention is a method of fabricating an optical waveguide which comprises coating the surface of a peelable substrate with a energy ray-sensitive and refractive index-variable material, and irradiating the coat with an energy ray to form a refractive index pattern layer comprising a core layer and a clad layer, then forming another clad layer on the surface of the refractive index pattern layer, and then peeling the substrate off from the refractive index pattern layer to fabricate an optical waveguide of which the top face or the bottom face of the refractive index pattern layer, which includes the top face or the bottom face of the core layer, is not covered by the clad layer.

According to the present invention, an optical waveguide wherein the core layer is disposed within the clad layer, and one face of the top face and the bottom face of the core layer is not covered by the clad layer, and the another face is covered by the clad layer, can be obtained in a simple process. Moreover, according to the present invention, it is possible to fabricate an optical waveguide in which the difference in height between the top face of the core layer and the top face of the clad layer, or the difference in height between the bottom face of the core layer and the bottom face of the clad layer, is not more than 0.1 μm.

DETAILED DESCRIPTION OF THE PREFERRED EMBODIMENTS

Preferred embodiments of the present invention will be described in detail below with reference to the drawings.

Figure 1:
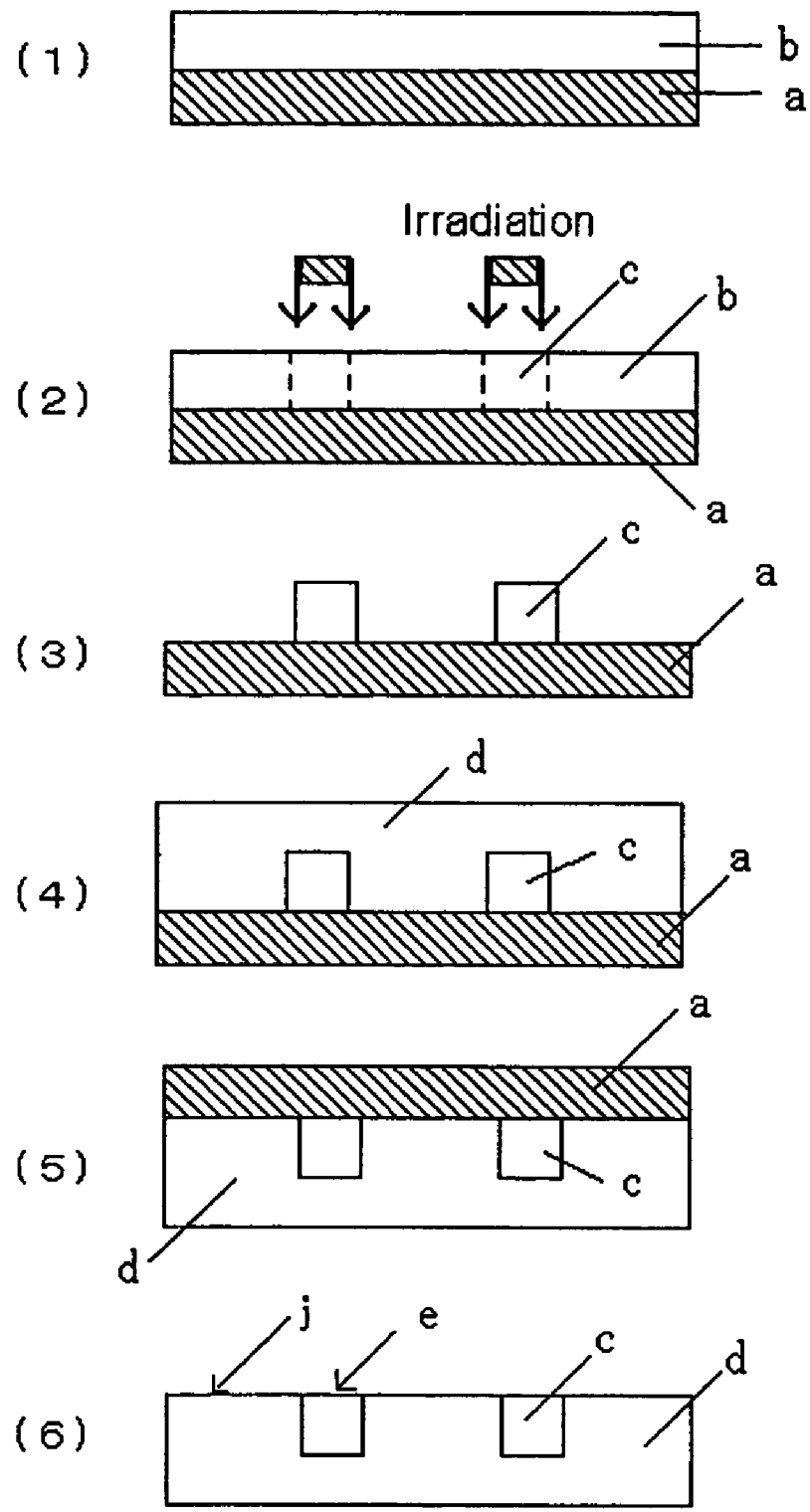
FIG. 1 shows a schematic sectional view of each step in a method of fabricating an optical waveguide according to an embodiment of the present invention.
Figure 2:
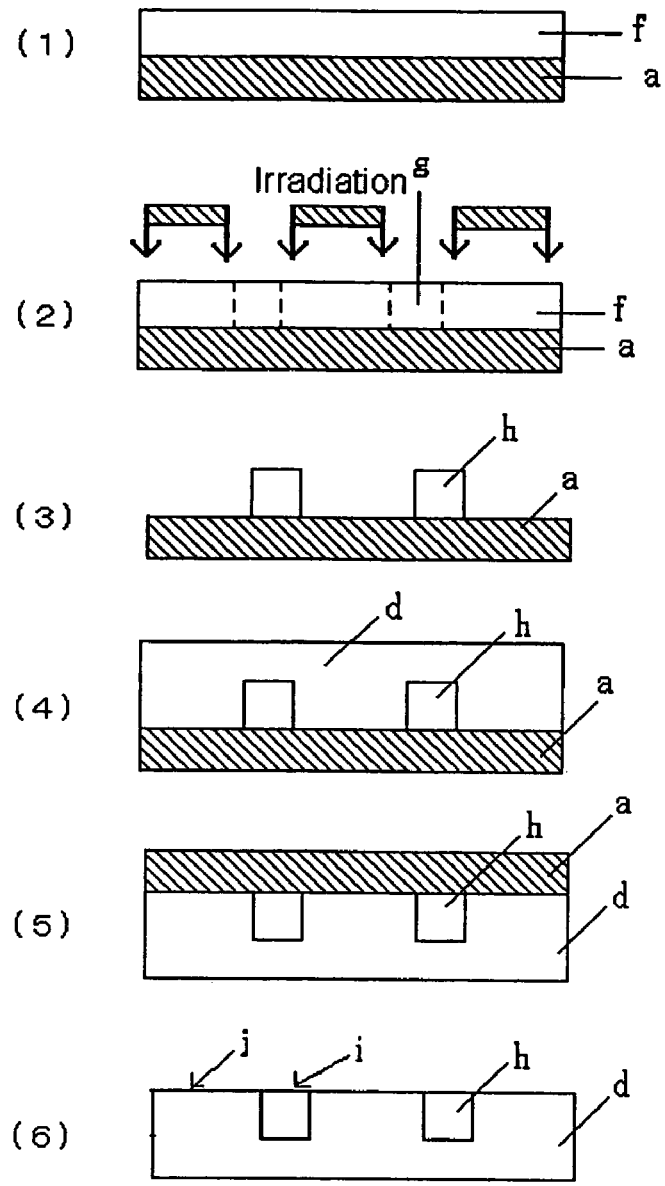
FIG. 2 shows a schematic sectional view of each step in a method of fabricating an optical waveguide according to an embodiment of the present invention.

FIG. 1 and FIG. 2 show schematic sectional view of method of fabricating an optical waveguide which comprises coating the surface of a peelable substrate with the negative or positive energy ray-sensitive material, irradiating the coat with an energy ray, and developing the irradiated coat to form a core layer, then coating the parts of the surface of the core layer and the substrate with a material for forming a clad layer, wherein a clad layer is to be formed on the parts, to form the clad layer having a lower refractive index than that of the core layer, and then, peeling the substrate off from the core layer and the clad layer to fabricate an optical waveguide of which the top face or the bottom face of the core layer is not covered by the clad layer. In particular, the method shown in FIG. 1 is an example of methods which use a negative energy ray-sensitive material as a material for forming the core layer, and the method shown in FIG. 2 is an example of methods which use a positive energy ray-sensitive material as a material for forming the core layer.

In the method shown in FIG. 1, at first, the surface of a peelable substrate (a) is coated with a negative energy ray-sensitive material (b) for forming the core layer [FIG. 1 (1)]. Then, the part where the core layer is to be formed is irradiated with an energy ray in a pattern [FIG. 1 (2)], and development is conducted to form the core layer (c) in a desired pattern [FIG. 1 (3)]. Then, the parts where a clad layer is to be formed on the surface of the core layer (c) and the surface of the substrate (a) are coated with a material for forming the clad layer. The coat of the material for forming the clad layer is hardened as desired to form the clad layer (d) [FIG. 1 (4)]. The refractive index of the clad layer (d) is lower than that of the core layer (c). After forming the clad layer (d), it is optionally turned upside down [FIG. 1 (5)]. Then, the substrate (a) is peeled off from the core layer (c) and the clad layer (d) to provide the intended optical waveguide [FIG. 1 (6)].

The optical waveguide obtained by this method has a configuration in which the core layer (c) is disposed within the clad layer (d), as the bottom face and side faces of the core layer (c) having the desired pattern is in contact with the clad layer (d). However, the top face (e) of the core layer (c) is not covered by the clad layer (d). Furthermore, the difference in height between the top face (e) of the core layer (c) and the top face (j) of the clad layer (d) is small.

In the method shown in FIG. 1, the substrate (a) is inverted after the clad layer (d) is formed [FIG. 1 (5)]. However, it is of course possible to peel the substrate (a) off from underside without inverting the clad layer (d). In case that the substrate (a) is inverted and peeled off, an optical waveguide of which the top face (e) of the core layer (c) is not covered by the clad layer is obtained. On the other hand, in case that the substrate (a) is peeled off without being inverted, an optical waveguide of which the bottom face of the core layer (c) is not covered by the clad layer is obtained. This also holds true of the methods described afterward with reference to FIG. 2 and FIG. 4.

The peelable substrate (a) may be suitably made of a material which is inherently releasable, such as a polyethylene terephthalate (PET) sheet. Alternatively, a releasable substrate made of a paper, metal sheet, plastic sheet or glass plate, of which one face (the other face than the polyvinyl chloride film layer) of an adhesive layer is treated with a releasing agent such as silicon, wax or fluorine resin can also be used.

As the negative energy ray-sensitive material (b), known materials can be used. Concretely, the materials which can be used for forming a core layer are able to be hardened by irradiating a coat thereof with an energy ray (e.g., visible radiation, ultraviolet rays or heat wave) so that the hardened part of the coat is insoluble in a developer and the non-irradiated part of the coat is soluble in the developer to form.

By painting or printing the material (b) on the substrate (a), a coat for constituting the core layer can be formed. The painting or printing can be accomplished by, for instance, using a roller, spraying, curtain-rolling or silk-screening.

The energy rays suitable for the purpose include, for instance, argon laser beam (488 nm), semiconductor laser beam (830 nm), YAG laser beam (1.06 μm).

Development is performed by treatment with water or an organic solvent. In case that the material (b) is anionic, an alkaline developer can be used for the treatment. In case that the material (b) is cationic, an acid developer can be used for the treatment. In either case, development can be accomplished by a known method.

The material for forming the clad layer (d) does not limited provided that it can form a clad layer having a lower refractive index than that of the core layer. For instance, it can be a known material such as a thermoplastic resin and setting resin.

Usable thermoplastic resins include, for instance, acrylic resin, epoxy resin, silicon resin, polycarbonate resin, siloxane resin, polyimide resin, polyurethane resin, oxetane resin, polyethersulfone resin, polyphenyl sulfide resin, polyetherimide resin, polysulfone resin, polyether ketone resin, polyamide resin, polyethylene resin, polypropylene resin, polyethylene terephthalate (PET) resin, phenol novolac resin, ethylene-vinyl alcohol copolymer, ethylene-vinyl acetate copolymer, polystyrene resin, fluorine resin, polybutylene terephthalate resin, polyacetal resin, polyether nitrile resin, polyamide 11, polyolein-maleimide copolymer, aramid resin, liquid crystal polymer (e.g., polyacetal copolymer, manufactured by Asahi Kasei Chemicals Corporation, commercial name: Tenac series) and cyanate resin.

Usable setting resins include, for instance, thermosetting resins, cold setting resins and active energy ray-curable resins. As the active energy ray-curable resin a material of the same kind as the negative energy ray-sensitive material (b) can also be used. In case that an active energy ray-curable resin is used, the coat of the resin can be set by irradiation with an active energy ray all over.

It is also possible to use a dry film (a base film may be optionally used) as the material for forming the clad layer (d), and the dry film can be thermally laminated over the surface of the core layer (b) to form the clad layer (d).

It is preferable for the refractive index of the eventually formed clad layer (b) to be lower than that of the core layer (c) by 0.1% or more.

In the method shown in FIG. 2, at first, the surface of a peelable substrate (a) is coated with a positive energy ray-sensitive material (f) for forming the core layer [FIG. 2 (1)]. Then, other parts than where the core layer is to be formed is irradiated with an energy ray in a pattern [FIG. 2 (2)], and non-irradiated part (g) is developed to form the core layer (h) [FIG. 2 (3)]. Then, the parts where a cald layer is bo be formed on the surface of the core layer (h) and the surface of the substrate (a) are coated with a material for forming the clad layer. This coat of the material for forming the clad layer is hardened as desired to form the clad layer (d) [FIG. 2 (4)]. The refractive index of this clad layer (d) is lower than that of the core layer (h). After forming the clad layer (d), it is optionally turned upside down [FIG. 1 (5)]. Then, the substrate (a) is peeled off from the core layer (h) and the clad layer (d) to provide the intended optical waveguide [FIG. 2 (6)].

The optical waveguide obtained by this method has a configuration in which the core layer (h) is disposed within the clad layer (d), as the bottom face and side faces of the core layer (h) having the desired pattern is in contact with the clad layer (d). However, the top face (i) of the core layer (h) is not covered by the clad layer (d). Furthermore, the difference in height between the top face (i) of the core layer (h) and the top face (j) of the clad layer (d) is small.

Since the method shown in FIG. 2 is a version of the method shown in FIG. 1 only differing in that the positive energy ray-sensitive material (f) is used in place of the negative energy ray-sensitive material (b), its detailed description will be dispensed with except for the difference between the negative and the positive.

As the positive energy ray-sensitive material (f), known materials can be used. Concretely, the materials which can be used for forming a core layer are able to be decomposed by irradiating a coat thereof with an energy ray (e.g., visible radiation, ultraviolet rays or heat wave) so that the decomposed part of the coat is increased in solubility in a developer and the core layer (h) can be formed by development.

Figure 3:
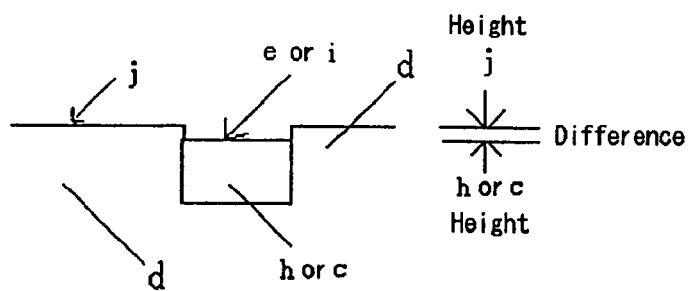
FIG. 3 shows a schematic sectional view illustrating the difference in height between the top face of the core layer and that of the clad layer.

FIG. 3 shows the difference in height between the top face (e or i) of the core layer and the top face (j) of the clad layer. In the present invention, it is preferable for the difference in height between the top face (e or i) of the core layer and the top face (j) of the clad layer, or between the bottom face of the core layer and the bottom face of the clad layer to be not more than 0.1 µm. In order to reduce this difference, it is preferable to use a substrate having a smooth surface as the peelable substrate (a), to form the core layer by coating with a liquid negative or positive energy ray-sensitive material, irradiating it with an energy ray and performing development, and to form the clad layer (d) by using a liquid thermosetting resin, a liquid cold setting resin or a liquid active energy ray-curable resin.

Figure 4:
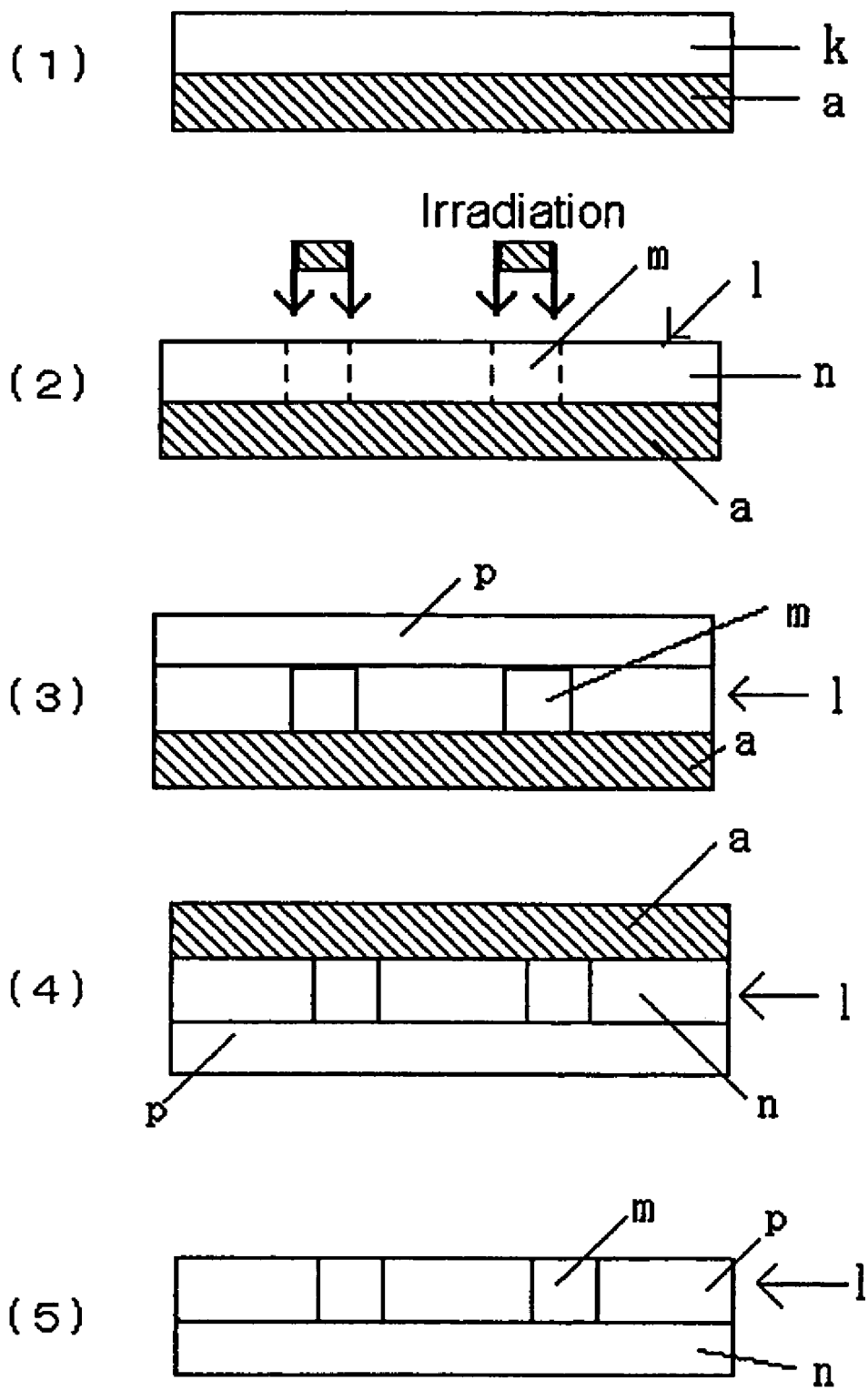
FIG. 4 shows a schematic sectional view of each step in a method of fabricating an optical waveguide according to an embodiment of the present invention.

FIG. 4 shows a schematic sectional view of method of fabricating an optical waveguide which comprises coating the surface of a peelable substrate with an energy ray-sensitive and refractive index-variable material, and irradiating the coat with an energy ray to form a refractive index pattern layer comprising a core layer and a clad layer, then forming another clad layer on the surface of the refractive index pattern layer, and then peeling the substrate off from the refractive index pattern layer to fabricate an optical waveguide of which the top face or the bottom face of the refractive index pattern layer, which includes the top face or the bottom face of the core layer, is not covered by the clad layer.

In the method shown in FIG. 4, at first, the surface of a peelable substrate (a) is coated with an energy ray-sensitive and refractive index-variable material (k) for forming the core layer and the clad layer [FIG. 4 (1)]. Then, a refractive index pattern layer (l) is formed by irradiation with an energy ray. A high-refractive index part of this refractive index pattern layer (l) constitutes the core layer (m), and its low-refractive index part constitutes the clad layer (n) [FIG. 4 (2)]. Then, a clad layer (p) is formed over the surface of the refractive index pattern layer (l) [FIG. 4 (3)]. After forming the clad layer (p), it is optionally turned upside down [FIG. 4 (4)]. Then, the substrate (a) is peeled off from the refractive index pattern layer (l) to provide the intended optical waveguide of which the top face of the refractive index pattern layer (l) is not covered by the clad layer [FIG. 4 (5)].

In the method, the same elements and means including the peelable substrate (a) and irradiation with an energy ray as in the foregoing methods can be used.

As the energy ray-sensitive and refractive index-variable material (k), known materials can be used, and for instance, materials used in a process named as photo-bleaching can be used. Specific examples of them include photosensitive polysilane, photosensitive polyimide, photosensitive polysilane/polysilazane, and acidic or basic decomposable compound/nondecomposable compound against acid or base/energy ray-sensitive acid or base generator.

Examples of the present invention will be described below. However, the present invention is not limited to these examples. In the following description "part" and "%" respectively mean "part by weight" and "% by weight".

EXAMPLE 1

In this Example, an optical waveguide was fabricated in the following manner in the sequence of steps shown in FIG. 1.

At first, PET sheet (thickness: 1 mm) having a silicon-treated smooth surface was provided as the peelable substrate (a).

On the other hand, 100 parts (solid component) of a photo-setting resin (solid resin content: 55%; organic solvent: propylene glycol monomethyl ether; acid value of resin: 65 mgKOH/g; number-average molecular weight: about 20,000) which was prepared by reacting styrene-acrylic acid copolymer (acid value of resin: 293 mgKOH/g; styrene/acrylic acid=80/20 in weight ratio) with 125 parts of glycidyl were blended with 3 parts of photo-polymerization initiator (titanocene compound manufactured by Ciba-Geigy; commercial name: CGI-784) and 1 part of photo-sensitizer (manufactured by Nippon Kanko Shikiso Kabushiki Kaisha; commercial name: NKX-1595) to obtain a photosensitive liquid to be used as the negative energy ray-sensitive material (b).

According the same method as that for preparing the above photosensitive liquid, another photosensitive liquid was prepared by blending the components except that the styrene-acrylic acid copolymer was replaced by acrylic resin (methyl methacrylate/butyl methacrylate=80/20 in weight ratio) to obtain a photosensitive liquid to be used as the material for forming the clad layer (d).

Then, the surface of the substrate (a) was coated with the negative energy ray-sensitive material (b), and the coat was irradiated with an argon laser (emission line 488 nm) beam of 70 mJ/cm$^2$ in energy density. After that, development was carried out with an aqueous solution of sodium carbonate (0.25%) as the alkali developer to form the core layer (c).

Then, the material for forming the clad layer (d) was coated on the core layer (c) and the parts where a clad layer to be formed. After that, the material for forming the clad layer (d) was hardened by irradiating it with an energy ray at an energy density of 70 mJ/cm$^2$ all over by using an argon lamp to form the clad layer (d). Then, the substrate (a) was peeled off from the core layer (b) and the clad layer (d) to obtain the intended optical waveguide.

The top face (e) of the core layer (b) of the optical waveguide is not covered by the clad layer (d). The difference in height between the top face of the core layer (b) and the clad layer (d) (difference between j and e) was satisfactorily no more than 0.1 µm. There was satisfactorily no gap in their interface.

EXAMPLE 2

The another optical waveguide was fabricated in the following manner in the sequence of steps shown in FIG. 2.

At first, a reaction product of about 5200 in molecular weight obtained from 200 parts of tetrahydrofuran/65 parts of P-hydroxystyrene/28 parts of n-butyl acrylate/11 parts of acrylic acid was blended with 60 parts of divinyl ether compound which is a condensate of bisphenol compound and 2-chloroethyl vinyl ether (1:2 in mol ratio), 10 parts of photo-acid generator (manufactured by Midori Kagaku Co., Ltd.; commercial name: NAI-105) and 1.5 parts of photosensitized pigment (coumaric pigment manufactured by Nippon Kanko Shikiso K.K.; commercial name: NKX-1595) to obtain a photosensitive liquid to be used as the positive energy ray-sensitive material (f).

On the other hand, the same materials to form the peelable substrate (a) and the clad layer (d) as those for Example 1 were used.

Then the surface of the substrate (a) was coated with the positive energy ray-sensitive material (f), and the coat was irradiated with an argon laser (emission line 488 nm) beam of 70 mJ/cm$^2$ in energy density. After that, development was carried out with an aqueous solution of sodium carbonate (0.25%) as the alkali developer to form the core layer (h).

Then, the material for forming the clad layer (d) was coated on the core layer (h) and the parts where a clad layer to be formed. After that, the material for forming the clad layer (d) was hardened by irradiating it with an energy ray at an energy density of 70 mJ/cm$^2$ all over by using an argon lamp to form the clad layer (d). Then, the substrate (a) was peeled off from the core layer (h) and the clad layer (d) to obtain the intended optical waveguide.

The top face (i) of the core layer (h) of this optical waveguide is not covered by the clad layer (d). The difference in height between the top face of the core layer (h) and the clad layer (d) (difference between j and i) was satisfactorily no more than 0.1 μm. There was satisfactorily no gap in their interface.

The invention claimed is:

1. A method of fabricating an optical waveguide which comprises:
    coating the surface of a releasable substrate, said surface being treated with a releasing agent, with a negative energy ray-sensitive material or a positive energy ray-sensitive material, irradiating the coat with an energy ray, and developing the irradiated coat to form a core layer,
    then, coating the parts of the surface of the core layer and the substrate with a material for forming a clad layer, wherein a clad layer is to be formed on the parts, to form the clad layer having a lower refractive index than that of the core layer, and
    then, peeling the substrate off from the core layer and the clad layer to fabricate an optical waveguide of which the top face or the bottom face of the core layer is covered by no clad layer.

2. The method of fabricating an optical waveguide according to claim 1 wherein the difference in height between the top face of the core layer and the top face of the clad layer or the difference in height between the bottom face of the core layer and the bottom face of the clad layer is not more than 0.1 μm.

3. The method of according to claim 1, wherein the releasing agent is selected from the group consisting of silicon, wax, and fluorine resin.

4. The method of fabricating an optical waveguide, comprising the steps of:
    applying a negative energy ray-sensitive material or a positive energy ray-sensitive material on a surface of a releasable substrate, said surface being treated with a releasing agent,
    irradiating the material with an energy ray in a pattern of a core layer,
    developing the irradiated material to form the core layer on the releasable substrate;
    forming a clad layer having a lower refractive index than of the core layer on the core layer and the substrate, thereby covering the core layer and the substrate with the clad layer, and
    peeling the substrate off from the core layer and the clad layer, thereby obtaining a face exposing the clad layer and the core layer which is not covered by the clad layer.

5. The method of according to claim 4, wherein a difference in height between an exposed face of the core layer and an exposed face of the clad layer on the face showing the clad layer and the core layer is no more than 0.1 μm.

6. The method according to claim 5, wherein a substrate having a smooth surface is used as the substrate, the core layer is formed by applying a liquid negative or positive energy ray-sensitive material, and the clad layer is formed by using a liquid thermosetting resin, a liquid cold setting resin, or a liquid active energy ray-curable resin.

7. The method according to claim 4, wherein the releasing agent is selected from the group consisting of silicon, wax, and fluorine resin.

* * * * *